R. DOUGLAS.
DRIER.
APPLICATION FILED JAN. 16, 1918.

1,301,112.

Patented Apr. 22, 1919.
2 SHEETS—SHEET 1.

WITNESSES:
George H Powell

INVENTOR
Robert Douglas
BY
his ATTORNEYS.

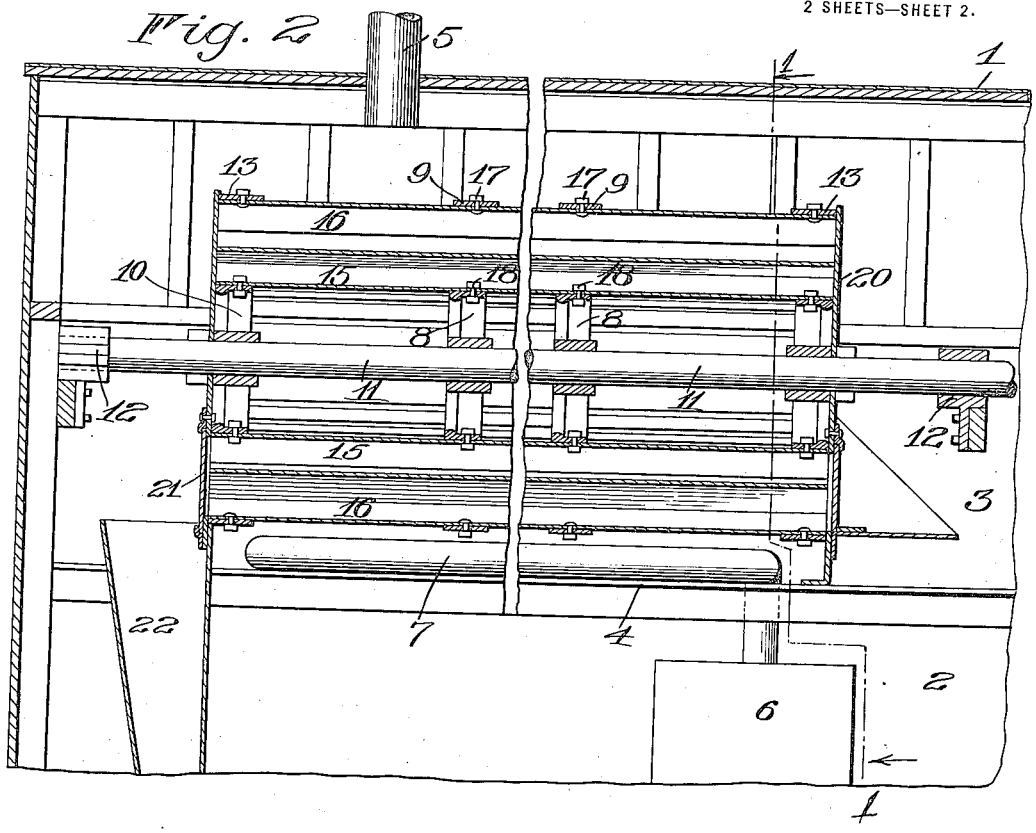
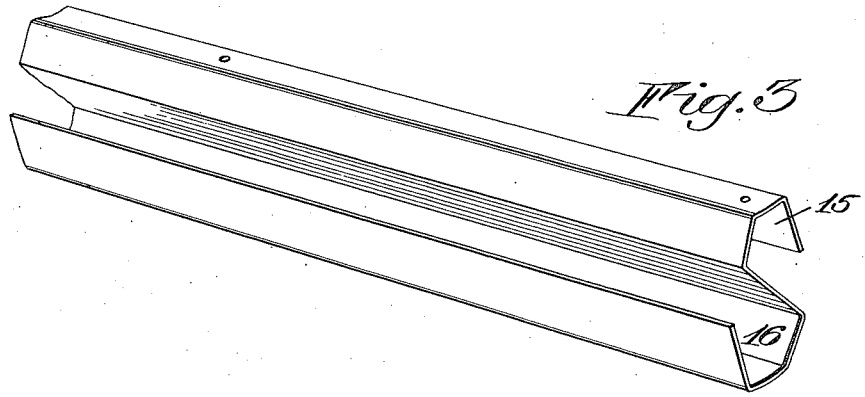

UNITED STATES PATENT OFFICE.

ROBERT DOUGLAS, OF ROCHESTER, NEW YORK, ASSIGNOR TO DOUGLAS PACKING COMPANY, INC., OF ROCHESTER, NEW YORK, A CORPORATION OF NEW YORK.

DRIER.

1,301,112.  Specification of Letters Patent.  Patented Apr. 22, 1919.

Application filed January 16, 1918. Serial No. 212,135.

*To all whom it may concern:*

Be it known that I, ROBERT DOUGLAS, of Rochester, in the county of Monroe and State of New York, have invented certain new and useful Improvements in Driers; and I do hereby declare the following to be a full, clear, and exact description of the same, reference being had to the accompanying drawings, forming a part of this specification, and to the reference-numerals marked thereon.

My present invention relates to drying and evaporating machinery and it has for its object to provide a simple and efficient machine of large capacity for drying such substances as fruits, grains and other vegetable products by tumbling them about in a current of dry air. Further objects of the invention are to provide a machine that can be readily cleaned and which is adapted for both solid and liquid contents. To these and other ends the invention resides in certain improvements and combinations of parts all as will be hereinafter more fully described, the novel features being pointed out in the claims at the end of the specifications.

In the drawings:

Fig. 2 is a longitudinal section taken on the line 1—1 of Fig. 2, and

Fig. 3 is a perspective view of one of the pocket members or troughs in detail.

Similar reference numerals throughout the several views indicate the same parts.

Figure 1:
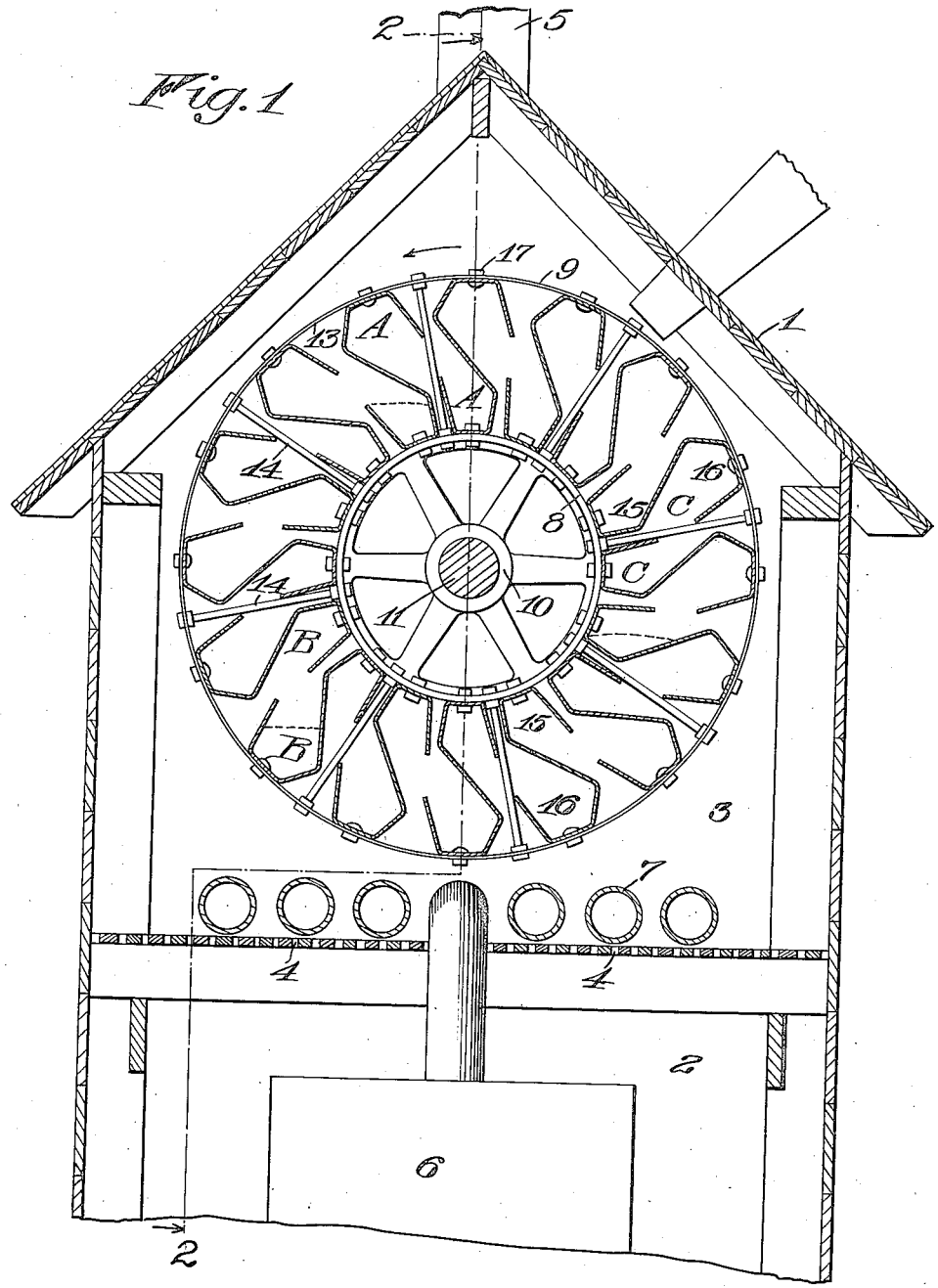
Figure 1 is a central transverse vertical section taken on the line 1—1 of Fig. 2 through a drier constructed in accordance with and illustrating one embodiment of my invention.

The invention has to do more particularly with the member for tumbling the material about in the presence of the air current and not with the means for producing or directing the current. In the present instance, I have illustrated a dry house 1 comprising a lower heater chamber 2 and an upper drying chamber 3 separated by a foraminous flooring 4 and the drying chamber 3 being provided with the usual vent 5 at the top. A heater 6 in the chamber 2 is connected to flues 7 on the floor of chamber 3 and the dry air admitted in a suitable manner to the chamber 2 passes through the floor 4 and around the flues 7 filling the chamber 3 and finally escaping at 5. Most any of the well known heating methods may be employed, the chamber 3 simply representing in the present instance means for inclosing an atmosphere suitable for drying.

In the chamber 3 I arrange a rotary skeleton cylinder comprising in the present instance, inner and outer circular supporting elements 8 and 9, the former of which consists of a number of wheels or spiders 10 on a shaft 11 mounted in bearings 12. The outer element consists of a number of hoops or bands 13 connected to the inner member by spokes or radial bolts 14. The shaft 11 is revolved to the left in Fig. 1, slowly, by any suitable gearing (not shown) and the cylinder is fixed thereto to turn in the direction indicated by the arrow.

Between the supports 8 and 9, the cylinder is provided with inner and outer sets of peripheral pockets 15 and 16 that receive the material to be dried and are adapted to empty it back and forth into each other as the cylinder is rotated. The pockets are arranged in pairs consisting of units of each set radially alined but the inner pocket of one pair delivers to and receives from the outer pocket of the adjacent pair for the reason that the pairs of pockets mentioned are formed integrally from a single sheet of material bent into the form of an S, as shown in Figs. 1 and 3. These trough shaped members extend longitudinally of the periphery of the cylinder and are bolted to the outer supporting bands 9 at 17 and to the inner supporting wheels 8 at 18 and they are also spaced from each other so that the air may circulate freely between them in the direction of extent of the spokes 14. The connecting portion of the trough forming each pair of pockets is inclined in the direction of rotation of the cylinder and the lips of the pockets that the inner one of a pair overhangs and delivers to the upper one of the pair to the left on the down trip and the lip of the latter overhangs and delivers to the first mentioned inner pocket on the upward movement. Thus, in the position A, Fig. 1, the material is in the inner pocket 15. When the position B is reached, the material is dumped into the outer pocket 16 and when the position C is reached, it is dumped back into the inner pocket 15. In no instance is the material directed otherwise or permitted to escape and as it is poured back and forth it is traversed by the current of air passing between the troughs or pairs of pockets.

The cylinder may be sealed at the ends, particularly when juicy or liquid materials are being treated, by disks 20 and suitable alined doors 21 in these disks permit the contents to be pushed out of each pair of pockets when dried into a chute 22 through the use of a suitable implement, and the troughs or pockets may also be cleaned in this manner.

I claim as my invention:

1. A drier comprising a rotary cylinder adapted to permit the free transverse circulation of air and having inner and outer sets of peripheral pockets adapted to empty back and forth into each other as the cylinder is rotated, air openings being provided between the pockets.

2. A drier comprising a rotary cylinder having inner and outer sets of peripheral pockets, said pockets being formed in pairs composed of a pocket in each set radially alined and the inner pocket of one pair and the outer pocket of an adjacent pair being adapted to empty back and forth into each other as the cylinder is rotated.

3. In a drier, the combination with a cylinder having inner and outer circular supports, of a plurality of integral troughs mounted between the supports to form inner and outer sets of pockets adapted to empty back and forth into each other as the cylinder is rotated.

4. In a drier, the combination with a cylinder, of a plurality of substantially S-shaped troughs mounted longitudinally of the periphery of the cylinder and formed from integral sheets or plates to provide inner and outer sets of pockets, the inner pocket of one trough and the outer pocket of the adjacent one being adapted to empty back and forth into each other as the cylinder is rotated.

5. In a drier, the combination with a cylinder having inner and outer circular supports, of a plurality of substantially S-shaped and relatively spaced troughs mounted longitudinally of the periphery of the cylinder between the supports to provide inner and outer sets of pockets, the inner pocket of one trough and the outer pocket of the adjacent one being adapted to empty back and forth into each other as the cylinder is rotated, the troughs being secured to both supports, and radial spokes connecting the latter and located between the troughs.

ROBERT DOUGLAS.

Witnesses:
G. WILLARD RICH,
AGNES NESBITT BISSELL.